United States Patent

[11] 3,619,026

| [72] | Inventor | Ivan Cindrich<br>Southfield, Mich. |
| --- | --- | --- |
| [21] | Appl. No. | 863,898 |
| [22] | Filed | Oct. 6, 1969 |
| [45] | Patented | Nov. 9, 1971 |
| [73] | Assignee | Chain Lakes Research Corporation<br>Detroit, Mich. |

[54] THREE-DIMENSIONAL HOLOGRAM DISPLAY
3 Claims, 2 Drawing Figs.

| [52] | U.S. Cl. | 350/3.5, 35/12 N |
| --- | --- | --- |
| [51] | Int. Cl. | G02b 27/00 |
| [50] | Field of Search | 350/3.5; 35/12 N, 12 S |

[56] References Cited
UNITED STATES PATENTS

| 3,435,452 | 3/1969 | Kilpatrick | 350/3.5 |
| --- | --- | --- | --- |
| 3,530,442 | 9/1970 | Collier et al. | 350/3.5 |
| 3,530,780 | 9/1970 | Haynes | 350/3.5 |

OTHER REFERENCES

Haines et al., Applied Optics, Vol. 7, No. 6, June 1968, pp. 1185–1189

*Primary Examiner*—David Schonberg
*Assistant Examiner*—Ronald J. Stern
*Attorney*—Barnard, McGlynn & Reising ABSTRACT: A holographic image-reproduction apparatus comprising coextensive two-dimensional arrays of developed holograms and coherent light sources operable by a keyboard and logic unit to permit selective energization of sources. Each hologram contains at least one interference pattern representing an object image at a spatial location identified by coordinate selection switches in the keyboard. A nonflat diffuser is disposed between the holograms and the viewing area to permit 360° viewing.

INVENTOR
Ivan Cindrich
BY
Barnard, McGlynn & Reising
ATTORNEYS

THREE-DIMENSIONAL HOLOGRAM DISPLAY

This invention relates to holographic image reproduction and, more particularly, to an arrangement of selectively illuminable developed holograms for selectively producing one or more images at predetermined locations in a viewing field.

It is now well known that three-dimensional objects images may be produced in space by holographic techniques. The holographic image-forming technique, generally described, involves the preparation of the hologram, i.e., the photographic record of the object, and the later illumination of the hologram to produce an image of the recorded object. The record is prepared by illuminating the object with light from a coherent source, such as a laser, and directing both the object reflected light and the original source light onto a plate containing a photographic emulsion. The emulsion, thus, receives and records an optical interference pattern containing both the intensity distribution of light from the object and the phase or interference pattern existing between the reflected and original light beams. When the developed plate, which then constitutes the record or hologram, is again illuminated with coherent light from the source, defraction at the record recreates the optical wavefront containing the intensity and phase information so that an observer may view a three-dimensional image of the original object.

The subject invention utilizes such holographic techniques to create a spatial display of holographic images representing, on a predetermined scale, the spatial arrangement of monitored objects in real space. In a specific application of the invention, holographic records may be used to create a spatial arrangement of object images in a viewing field corresponding to the arrangement of aircraft in a holding zone in the vicinity of a control tower. Such spatial arrangement of images permits visual observation of the number and relative locations of the aircraft and may be continuously changed in accordance with changing locations of the aircraft in the holding zone, thus, to permit continuous observation and monitoring of the aircraft for control purposes.

In general, this is accomplished by apparatus including a two-dimensional array of developed holograms each containing at least one interference pattern representing an object in a distinct location identifiable by a distinct coordinate set, and means for selectively illuminating one or more of the holograms with coherent light to create a display of images in a viewing area. Such apparatus includes control means such as a keyboard or other input device to control the illumination of the holograms in accordance with the location and movements of aircraft or other monitored objects in real space. Accordingly, by determining the coordinates of a monitored object in space, these coordinates may be related to a corresponding coordinate set which identifies a single hologram and employed to illuminate that hologram to create an image which is disposed in a viewing field just as the monitored object is disposed in real space.

The holographic apparatus of the subject invention also comprehends means by which the three-dimensionality and viewability of the holographic image or images are improved. In general, this means includes a light-diffusing member, commonly called a "scatterplate" disposed, on exposure, between the object and the undeveloped record and, upon reproduction, between the image and the developed record. The member is preferably of large and nonflat geometry, the concavity of which opens toward the object and image so as to "wrap around" the object thereby to capture light rays from nearly all sides of the object and to lend the reproduced image a depth and, thus, to permit viewing from any point around a completely circular or cylindrical viewing area.

The invention as well as the various features and advantages thereof may be best understood by reference to the following specification which describes and sets forth an illustrative embodiment of the invention.

The specification is to be taken with the accompanying drawing of which:

Figure 1:
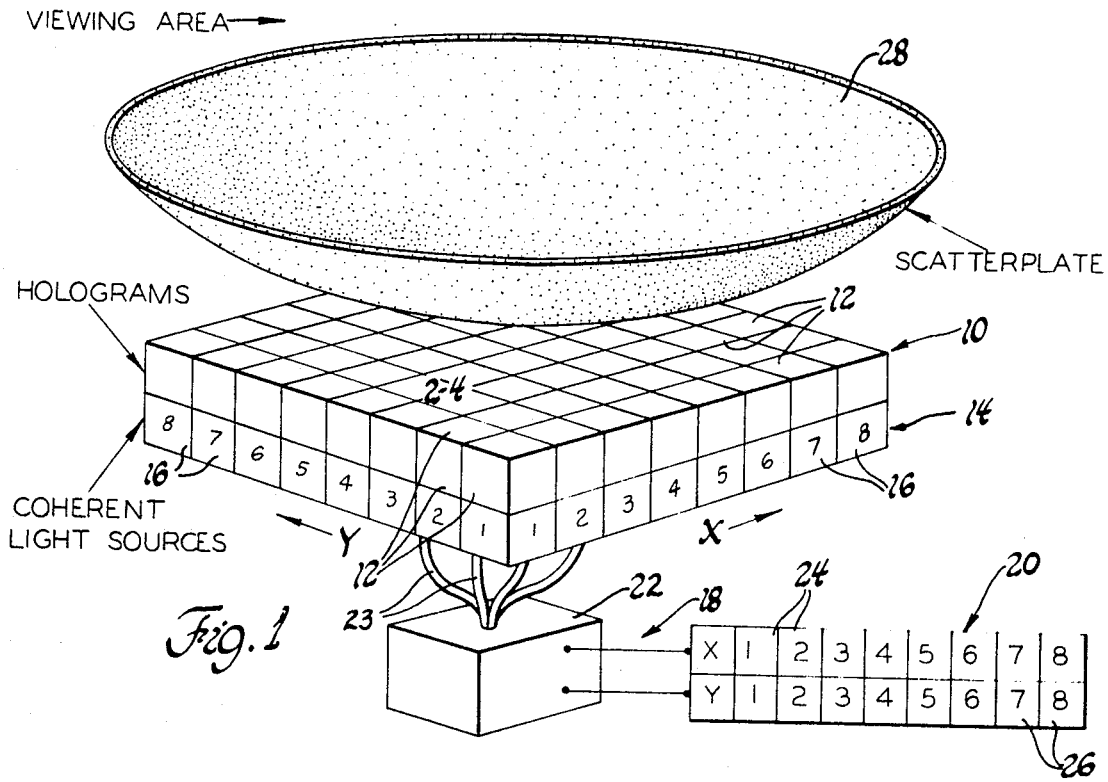
FIG. 1 is a block diagram in perspective of the illustrative embodiment.

In FIG. 1, the apparatus for creating a spatial display of holographic images comprises a two-dimensional array 10 of developed holograms 12 each of which contains at least one interference pattern representing the image of an object, such as an aircraft, in a location within a viewing area which is identifiable by a distinct coordinate set. In FIG. 1 the holograms 12 are arranged in a uniplanar 8 foot × 8 foot array having mutually perpendicular and horizontal X and Y axes as shown. The interference pattern record in each hologram 12 is produced by holographically recording a representative object in a given coordinate location relative to the array 10 previous to the development step. Accordingly, when illuminated with coherent light, each developed hologram 12 produces an object image at a given distance from the array 10 and at a point in space which is identifiable by coordinates corresponding to the X and Y axes shown. The representative objects may represent actual objects in real space and having real space coordinates which are related to the representative object coordinates in accordance with a known factor.

Adjacent the hologram array 10 is an eight foot × 8 foot array 14 of selectively operable coherent light sources 16 also disposed along the X and Y axes. Accordingly, each hologram 12 has associated therewith an individual light source 16 which may be separately energized to reproduce the image recorded in the hologram. Because the sources 16 are arranged in the 8 foot × 8 foot array each source is, thus, identifiable by the specification of two coordinates, the first of which locates the X axis position and the second of which locates the Y axis position. The sources 16 may be separate light sources or, alternatively, replaced with a single source with an array of lenses and shutters which are selectively operable.

The sources 16 are selectively actuated by means of a control system 18 which includes a coordinate switch keyboard 20 and a logic unit 22 having output lines 23 to each of the sources 16. Keyboard 20 includes an arrangement of eight pushbutton switches 24 for selecting the X axis coordinate of the sources 16 and an arrangement of eight pushbutton switches 26 for selecting the Y axis coordinate of the sources 16. The logic unit 22 responds to the coincident operation of a switch 24 and a switch 26 to actuate the source 16 in array 14 having X and Y coordinates corresponding to the selected switches and to maintain that source actuated for a predetermined time. The actuated source 16 illuminates the adjacent and aligned hologram 12 in array 10 to produce an object image in the viewing area. This image, as previously described is located in space at a position which is identifiable by the coordinates of the selected switches 24 and 26 and which is related to the position of a monitored aircraft in real space.

In FIG. 1, a dish-shaped scatterplate 28 of light-diffusing material is placed between the array 10 of holograms 12 and the viewing area. The scatterplate 28 is made of light diffusing glass or plastic and has a cross-sectional area which is slightly larger than that of the array 10 and very large as compared to the object to be holographically recorded and displayed. While shown as an integral unit, plate 28 may be constructed of flat elements disposed at small angles relative to one another such that the overall configuration is nonflat.

The curvature of the scatter plate 28 collects light reflected from the sides of the object and, thus, tends to wrap the recorded image around the object when illuminated, increasing the three-dimensional effect of the reproduced image. Scatterplate 28 is in the same position relative to the object and the array 10 when the holograms 12 are exposed as it is relative to the image and the developed holograms when they are illuminated for reproduction. The scatterplate 28, quite importantly, provides a real image with a 360°-viewing field; that is, the image may be viewed directly, rather than through the holograms and from any angle around the edge of the scatterplate 28. This significantly increases the practicability of the embodiment for multiple image-viewing applications.

The embodiment of FIG. 1 generally contemplates a single image in each hologram 12 and a single source 16 for axially illuminating each hologram. However, the density of images may be significantly increased by recording multiple images in each hologram 12 by employing a thick, bulk-type hologram and light from sources which are nonaxial with respect to the holograms. Thus, when illuminated for image reproduction, a given image is selected by suitably adjusting the angle of the source relative to the developed hologram.

Figure 2:
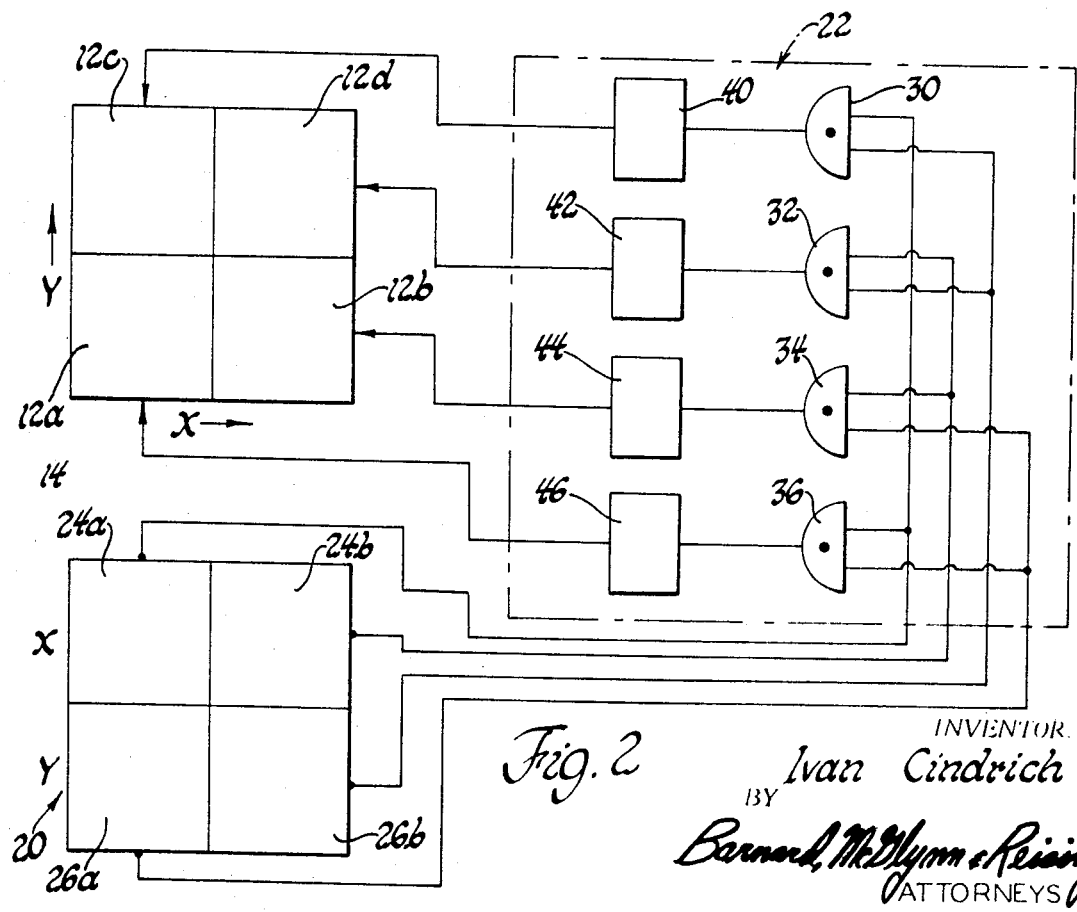
FIG. 2 is a block diagram of a representative portion of a suitable control system for the system of FIG. 1.

FIG. 2 shows a representative portion of the control means of FIG. 1 in greater detail. The keyboard 22 is illustrated as comprising two X-axis switches 24a, 24b and two Y-axis switches 26a, 26b. Logic unit 22 comprises four AND-gates 30, 32, 34, and 36 each having two inputs and an output and four one-shot multivibrators 40, 42, 44, and 46 each having an input connected to an AND-gate. Source array 14 comprises four sources 12a, 12b, 12c, and 12d arranged in a square pattern having X and Y axes as shown. Gate 30 receives inputs from switches 24a and 26b and delivers an output to multivibrator 40 which in turn is connected to energize source 12c. Gate 32 receives inputs from switches 24b and 26b and delivers an output to multivibrator 42 which is connected to energize source 12d. Gate 34 receives inputs from switches 24b and 26a and delivers an output to multivibrator 44 which is connected to source 12b. Gate 36 receives inputs from switches 24a and 26a and delivers an output to multivibrator 46 which is connected to energize source 12a. Accordingly, each combination of X- and Y-axis switches operates through only one coincidence gate to actuate a single source for a period determined by the period of the multivibrators 40, 42, 44, and 46.

In operation, the circuit of FIG. 2 actuates a source 12 for a given period, thus, creating the corresponding image for that period. At the end of the period, the source is deactivated and the image disappears. Accordingly, new coordinate data must be reentered on a periodic basis in order to preserve the integrity of the display.

The keyboard 20 is generally suitable for manual operation where a limited member of images are recorded and displayed. However, where a large number of images are displayed and the particular display changes rapidly, as in the case of the aircraft-monitoring application, the source switches are preferably controlled by a high speed computer which samples various data channels rapidly and periodically in any of several well-known ways. It is to be understood that the aircraft in real space are monitored by means of radar or other means to continuously determine the location thereof with respect to a set of coordinates. Normally, since such aircraft reside at various altitudes, a three-dimensional coordinate set is employed for monitoring purposes. However, this may be reduced to a set of two coordinates for operation of the arrays 10 and 14, the holograms 12 being prepared such that one or more rows corresponds to one altitude and one or more other rows corresponds to another altitude. It is further to be understood that to achieve any given degree of accuracy a much larger or smaller two-dimensional array of holograms and sources than that shown in FIG. 1 may be employed. Accordingly, the embodiments of FIG. 1 and 2 are not to be construed in a limiting sense but are intended for illustration only.

The embodiments of the invention in which an exclusive property or privilege is claimed are defined as follows:

1. Apparatus for creating a spatial display of holographic images comprising: a two-dimensional array of developed holograms, each containing an interference pattern representing an object in a location corresponding to a distinct coordinate set, illuminating means on one side of the array actuable for selectively illuminating the holograms of the array with coherent light, a substantially dish-shaped diffuser disposed on the other side of the array, the diffuser being very large relative to the object and having a projected area at least as large as the area of the array, the diffuser being effectively dished toward the array and occupying a spatial disposition substantially identical to a spatial disposition occupied thereby during exposure of the holograms in the array whereby the real object images include viewable image areas extending substantially around the surfaces thereof away from the array, and control means connected to the illuminating means for selectively actuating the illuminating means according to respective coordinate sets.

2. Apparatus as defined in claim 1 wherein the control means comprises: first and second arrays of switches corresponding to the respective dimensions of the array of holograms, and logic means connecting the switches to the illuminating means in such order as to permit the selection of any given hologram by the operation of predetermined switches in the first and second arrays.

3. Apparatus as defined in claim 1 wherein the illuminating means includes a two-dimensional array of coherent light sources aligned with the array of holograms.

* * * * *